United States Patent
Kim et al.

(10) Patent No.: US 8,521,209 B2
(45) Date of Patent: Aug. 27, 2013

(54) METHOD AND APPARATUS OF POWER INCREASE/DECREASE REQUEST OF A USER EQUIPMENT USING A PLURALITY OF FREQUENCIES IN A WIRELESS COMMUNICATION SYSTEM

(75) Inventors: Sun Hee Kim, Anyang-si (KR); Kyung Jun Lee, Seoul (KR); Seung June Yi, Seoul (KR); Sung Hoon Jung, Anyang-si (KR); Sung Duck Chun, Sungnam-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 12/979,671

(22) Filed: Dec. 28, 2010

(65) Prior Publication Data

US 2011/0171989 A1    Jul. 14, 2011

Related U.S. Application Data

(60) Provisional application No. 61/294,088, filed on Jan. 11, 2010, provisional application No. 61/294,434, filed on Jan. 12, 2010.

(30) Foreign Application Priority Data

Oct. 11, 2010   (KR) .......................... 10-2010-0098789

(51) Int. Cl.
*H04M 1/00*   (2006.01)

(52) U.S. Cl.
USPC ............. 455/522; 455/69; 455/500; 455/517; 455/509; 455/515; 370/310; 370/328; 370/329; 370/343

(58) Field of Classification Search
USPC .................. 455/522, 68, 69, 127.1, 500, 517, 455/507, 509, 508, 515, 422.1, 403, 550.1, 455/445, 466, 426.1, 426.2; 370/310, 328, 370/329, 343
See application file for complete search history.

(56) References Cited

U.S. PATENT DOCUMENTS

2013/0094483 A1*   4/2013   Marinier et al. .............. 370/336

* cited by examiner

*Primary Examiner* — Keith Ferguson
(74) *Attorney, Agent, or Firm* — Morgan, Lewis & Bockius LLP (57) ABSTRACT

A method of a power increase/decrease request of a user equipment in a wireless communication system using a plurality of frequencies is disclosed. The method of operating of a user equipment comprises receiving grants for each of the plurality of uplink frequencies from a base station; dividing a maximum power of the user equipment for each of the plurality of uplink frequencies in accordance with the received grants, and selecting a corresponding transport block for each of the plurality of uplink frequencies by considering the received grants; and comparing a remaining power of the user equipment to a power obtained by subtracting a power required to transmit a first transport block selected for a first uplink frequency from a power required to transmit a minimum transport block, which transmits more data than those of the first transport block.

14 Claims, 10 Drawing Sheets

METHOD AND APPARATUS OF POWER INCREASE/DECREASE REQUEST OF A USER EQUIPMENT USING A PLURALITY OF FREQUENCIES IN A WIRELESS COMMUNICATION SYSTEM

This application claims the benefit of Korean Patent Application No. 10-2010-0098789, filed on Oct. 11, 2010, which is hereby incorporated by reference as if fully set forth herein. This application also claims the benefit of U.S. Provisional Application Ser. Nos. 61/294,088, filed on Jan. 11, 2010, and 61/294,434, filed on Jan. 12, 2010, the content of which is hereby incorporated by reference herein in their entirety.

BACKGROUND OF THE INVENTION

1. Field of the Invention

The present invention relates to a wireless communication system, and more particularly, to a method and apparatus of power increase/decrease request of a user equipment using a plurality of frequencies in a wireless communication system.

2. Discussion of the Related Art

First of all, a network structure of a universal mobile telecommunications system (UMTS) will be described with reference to FIG. 1.

Figure 1:
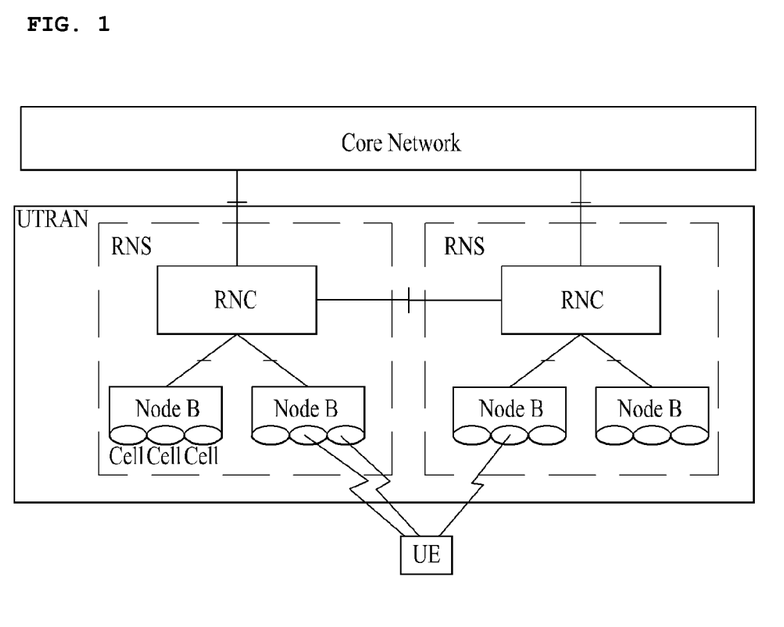
FIG. 1 is a diagram illustrating a network structure of a UMTS.

FIG. 1 is a diagram illustrating a network structure of a UMTS. As illustrated in FIG. 1, the UMTS includes a user equipment (UE), a UMTS terrestrial radio access network (UTRAN), and a core network (CN). The UTRAN includes one or more radio network sub-systems (RNS), each of which includes a radio network controller (RNC) and one or more base stations (Node B) managed by the RNC. One cell exists in one base station.

Figure 2:
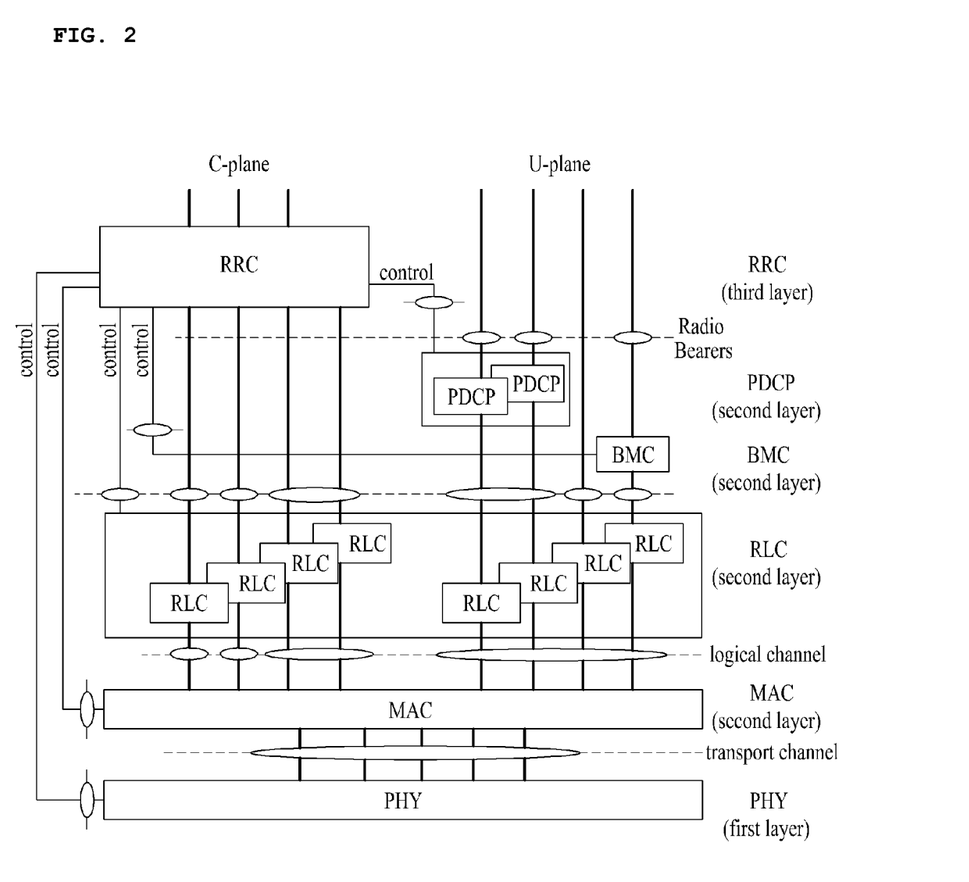
FIG. 2 is a diagram illustrating a structure of a radio protocol used in a UMTS.

Next, a structure of a radio protocol used in the UMTS will be described with reference to FIG. 2. FIG. 2 is a diagram illustrating a structure of a radio protocol used in an UMTS. Layers of the radio protocol exist in a user equipment and a UTRAN in pairs, and takes the role of data transmission. Each of the radio protocol layers will be described. A physical (PHY) layer belonging to the first layer serves to transmit data to a radio interval by using various radio transmission techniques. The PHY layer is connected with a MAC layer through a transport channel, wherein the MAC layer is located above the PHY layer. The transport channel is divided into a dedicated transport channel and a common transport channel depending on cannel sharing.

The MAC layer, an RLC layer, a packet data convergence protocol (PDCP) layer and a broadcast/multicast control (BMC) layer exist in the second layer. The MAC layer maps various logical channels into various transport channels, and performs logical channel multiplexing for mapping a plurality of logical channels into one transport channel.

The MAC layer is connected with its upper layer, i.e., the RLC layer through a logical channel, wherein the logical channel is divided into a control channel for information transmission of a control plane and a traffic channel for information transmission of a user plane depending on types of transmission information. Examples of the control channel include a common control channel (CCCH) for transmission of common control information, a dedicated control channel (DCCH) for transmission of control information to a specific user equipment, a broadcast control channel (BCCH) for reception of system information commonly applied to cells, and a paging control channel (PCCH) for reception of paging message. An example of the traffic channel includes a dedicated traffic channel (DTCH) for data transfer of the user plane to specific user equipment.

Also, the MAC layer is divided into a MAC-b sublayer, a MAC-d sublayer, a MAC-c/sh sublayer, a MAC-hs/ehs sublayer and a MAC-e/es or MAC-i/is sublayer depending on types of the transport channel. The MAC-b sublayer serves to manage a broadcast channel which is a transport channel for broadcasting of system information, the MAC-c/sh sublayer manages a forward access channel (FACH) which is a common transport channel shared with other user equipments, and the MAC-d sublayer serves to manage a dedicated channel (DCH) which is a dedicated transport channel of a specific user equipment. Also, the MAC-hs/ehs sublayer manages a high speed downlink shared channel (HS-DSCH) which is a transport channel for high-rate downlink data transmission, and the MAC-e/es or MAC-i/is sublayer manages an enhanced dedicated channel (E-DCH) which is a transport channel for high-rate uplink data transmission.

The RLC layer serves to ensure quality of service (QoS) of a radio bearer (RB) and takes the role of data transmission. The RLC layer one or two independent RLC entities per RB to ensure QoS of the RB, and provides three RLC modes, i.e., a transparent mode (TM), an unacknowledged mode (UM), and an acknowledged mode (AM) to ensure various quality of services (QoS). Also, the RLC layer serves to control data size to allow a lower layer to transmit data to a radio interval. To this end, the RLC layer performs segmentation and concatenation of data received from an upper layer.

The PDCP layer is located above the RLC layer. In order to effectively transmit data using IP packets (e.g., IPv4 or IPv6) within a radio-communication interval having a narrow bandwidth, the PDCP layer performs header compression that increases transmission efficiency of the radio-communication interval by allowing a packet header of data to transmit necessary information only. The PDCP layer mainly exists in a packet switched (PS) zone due to its header compression function. One PDCP entity exists per RB to provide an efficient header compression function for each PS service. However, if the PDCP layer exists in a circuit switched (CS) zone, it does not provide a header compression function.

In addition, the BMC layer exists above the RLC layer of the second layer, and performs scheduling of a cell broadcast message, and broadcasts the cell broadcast message to user equipments located in a specific cell.

A radio resource control (RRC) layer located on a lowest part of the third layer is defined in the control plane only and is associated with configuration, re-configuration and release of radio bearers (RBs) to be in charge of controlling parameters of the first and second layers and controlling the logical, transport and physical channels. In this case, the RB means a logical path provided by the first and second layers for data transfer between the user equipment and the UTRAN. Generally, establishing RB means that features of a radio protocol layer and channel required for a specific service are defined and their detailed parameters and action methods will be established.

Next, a dual cell high speed packet access (HSPA) will be described. The dual cell HSPA means that one user equipment transmits data by using two frequencies at the same time to increase data transmission as much as two times of the existing E-DCH transmission. Data transmission of the user equipment using two frequencies will be referred to as a dual cell E-DCH operation. Alternatively, communication between the user equipment and the base station using a plurality of frequencies or carriers will be referred to as carrier aggregation.

A method of a power increase/decrease request of a user equipment that performs a dual cell E-DCH operation according to the related art will be described. The user equipment requests the base station to increase or decrease the power by using a happy bit. If the user equipment requests the base station to increase the power, it transmits the happy bit set to unhappy. If the user equipment requests the base station to maintain the power as it is or decrease the power, it transmits the happy bit set to happy. The base station that has received the happy bit set to unhappy transmits enhanced grants to the user equipment to allow the user equipment to transmit more data. The base station that has received the happy bit set to happy transmits previous grants as they are to allow the user equipment to transmit data as much as previous data, or transmits lowered grants to the user equipment to allow the user equipment to transmit less data.

At this time, when the user equipment performs a power increase/decrease request by using the happy bit, it can transmit a transport block greater than that selected for transmission at next transmission time interval to a network. However, the user equipment notifies the network that it transmits a transport block smaller than that selected for transmission at next transmission time interval due to grant allocated from the network.

The user equipment uses an extended transport format combination indicator (E-TFCI) to identify the size of the transport block selected for transmission at next transmission time interval. Since the size of the transport block is defined for each E-TFCI, the happy bit represents whether the user equipment can select the E-TFCI that can transmit more data than those of the E-TFCI selected at next transmission time interval.

The user equipment that performs the dual cell E-DCH operation receives grants for each of a plurality of uplink frequencies from the base station, and divides its power into powers that can be used for each of the uplink frequencies by using the received grants. Then, the user equipment determines E-TFCI for transmission at next TTI by using the divided powers and the grants for each of the uplink frequencies. At this time, an idle power of each uplink frequency corresponds to a value obtained by subtracting the power required for transmission of the E-TFCI selected for transmission for each frequency at next TTI from the powers divided for the uplink frequencies.

If the user equipment can transmit data by selecting E-TFCI that allows more data transmission than E-TFCI selected for transmission at next TTI at the power divided for the first uplink frequency, it sets the happy bit of the first uplink frequency to unhappy. If the user equipment cannot transmit data by selecting E-TFCI that allows more data transmission than E-TFCI selected for transmission at next TTI at the power divided for the first uplink frequency, it sets the happy bit of the first uplink frequency to happy.

The idle power of the user equipment will be described in more detail. If the idle power of the first uplink frequency is greater than a value obtained by subtracting the power required for transmission of E-TFCI at next TTI from the power required for transmission of minimum E-TFCI that can transmit more data than those of the E-TFCI which will be transmitted at next TTI, the user equipment sets the happy bit of the first uplink frequency to unhappy. If the idle power of the first uplink frequency is smaller than a value obtained by subtracting the power required for transmission of E-TFCI at next TTI from the power required for transmission of minimum E-TFCI that can transmit more data than those of the E-TFCI which will be transmitted at next TTI, the user equipment sets the happy bit of the first uplink frequency to happy.

In other words, according to the related art, the user equipment sets the happy bit to the idle power for each frequency. In this case, although more data can be transmitted through a specific one frequency by using the remaining power of the user equipment, a problem occurs in that more data cannot be transmitted by using the idle power for each frequency of the user equipment. Accordingly, despite that the network can allocate more data and the user equipment can transmit more data, as the user equipment does not request the network to increase the power, a problem occurs in that scheduling is inefficient.

As described above, according to the related art, as the user equipment that performs the dual cell E-DCH operation sets the happy bit with the idle power for each frequency, a problem occurs in that scheduling is inefficient.

SUMMARY OF THE INVENTION

Accordingly, the present invention is directed to a method and apparatus of power increase/decrease request of a user equipment using a plurality of frequencies in a wireless communication system, which substantially obviates one or more problems due to limitations and disadvantages of the related art.

An object of the present invention is to provide a method of a power increase/decrease request for efficient scheduling.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of operating of a user equipment in a wireless communication system using a plurality of uplink frequencies, comprises the steps of receiving grants for each of the plurality of uplink frequencies from a base station; dividing a maximum power of the user equipment for each of the plurality of uplink frequencies in accordance with the received grants for each of the received uplink frequencies, and selecting a corresponding transport block for each of the plurality of more data than those of the first transport block, wherein the remaining power of the user equipment is obtained by subtracting a power required to transmit the selected corresponding transport block for each of the plurality of uplink frequencies from the maximum power of the user equipment.

Here, the method may further comprises the step of requesting power increase for the first uplink frequency if the remaining power of the user equipment is more than the first subtraction power.

In this case, the method may further comprises the step of requesting a power increase for a second uplink frequency different from the first uplink frequency, if a second subtraction power obtained by subtracting the first subtraction power from the remaining power of the user equipment is more than a third subtraction power obtained by subtracting a power required to transmit a second transport block selected for a second uplink frequency from a power required to transmit the second minimum transport block, which transmits more data than those of the second transport block.

Also, the method may further comprises requesting power maintenance for all of the plurality of uplink frequencies, if the remaining power of the user equipment is less than the first subtraction power.

Also, the power increase is requested using a bit.

Also, the plurality of uplink frequencies includes a primary uplink frequency and a secondary uplink frequency, and the first uplink frequency is the secondary uplink frequency.

Also, a size of each of the transport blocks and the minimum transport block is identified by an extended transport format combination indicator (E-TFCI).

In another aspect of the present invention, a user equipment in a wireless communication system using a plurality of uplink frequencies comprises an Rx module receiving grants for each of the plurality of uplink frequencies from a base station; and a processor dividing a maximum power of the user equipment for each of the plurality of uplink frequencies in accordance with the received grants for each of the received uplink frequencies, selecting a corresponding transport block for each of the plurality of uplink frequencies by considering the received grants, and comparing a remaining power of the user equipment to a first subtraction power obtained by subtracting a power required to transmit a first transport block selected for a first uplink frequency from a power required to transmit a first minimum transport block, which transmits more data than those of the first transport block According to the embodiments of the present invention, as the user equipment performs the power increase/decrease request by using the entire idle power, the power of the user equipment can be used efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to a UMTS, the following description can be applied to other mobile communication systems except for unique features of the UMTS.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment (UE) designates a mobile or fixed type user terminal such as a mobile station (MS). It is also assumed that a base station designates a random node of a network node, such as Node B and eNode B, which performs communication with the user equipment.

First of all, a dual cell high speed packet access (HSPA) will be described with reference to FIG. 3.

Figure 3:
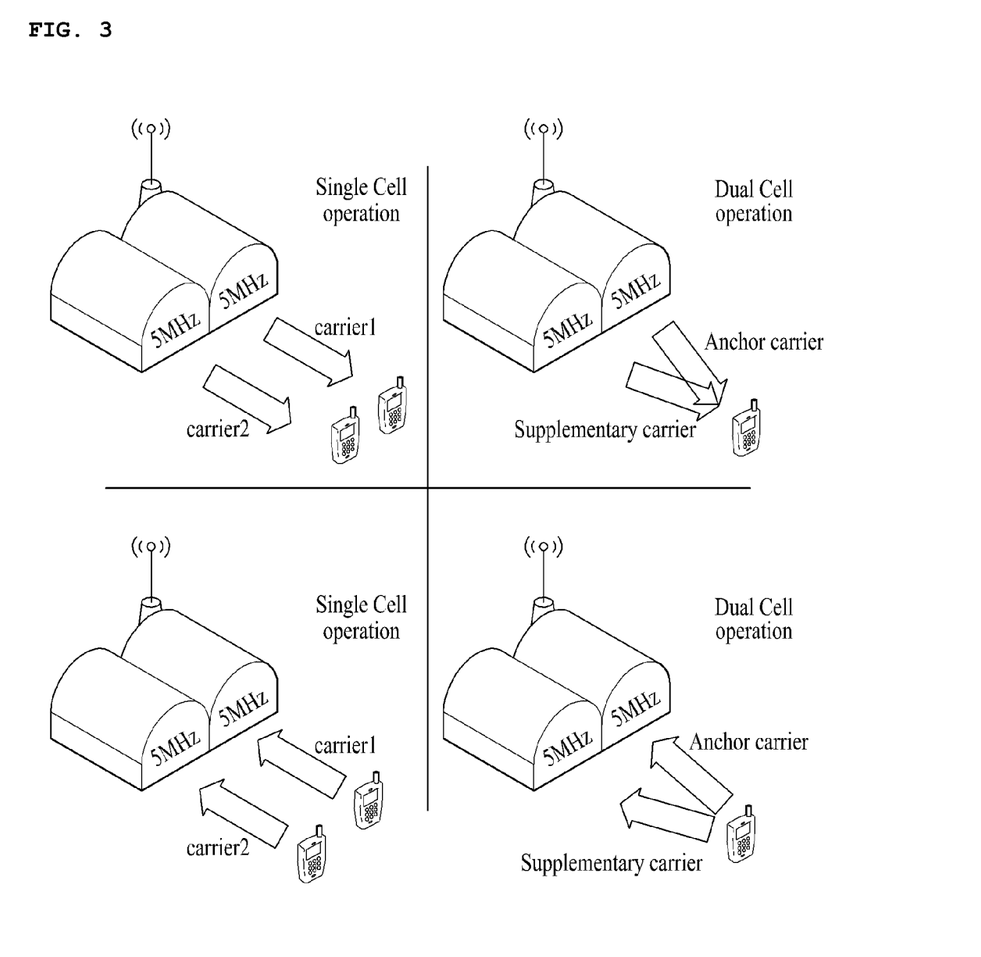
FIG. 3 is a diagram illustrating dual cell HSPA.

Unlike the related art that a user equipment transmits an enhanced dedicated channel (E-DCH) by using one frequency, as illustrated in FIG. 3, according to the dual cell HSPA, the user equipment transmits data by using two frequencies at the same time, whereby data transmission is increased as much as twice than the related art. According to the dual cell HSPA, the user equipment can transmit data to reach maximum 20 Mbps. An operation of the user equipment for data transmission using two frequencies will be referred to as a dual cell E-DCH operation.

Also, unlike the related art that the user equipment receives a high speed downlink shared channel (HS-DSCH) by using one frequency on a downlink, according to the dual cell HSPA, one user equipment receives data by using two frequencies, whereby received data are increased as much as twice. According to the dual cell HSPA, the user equipment can receive data to reach maximum 80 Mbps. An operation of the user equipment for data reception using two frequencies will be referred to as a dual cell HSDPA operation.

An example of a similar concept of the dual cell HSPA includes carrier aggregation. The carrier aggregation is to extend a bandwidth by collecting a plurality of carriers to increase a data rate. For example, the LTE system includes a single carrier of 20 MHz, whereas the LTE-A system extends a bandwidth to 100 MHz by collecting five carriers of 20 MHz. Also, the carrier aggregation includes aggregation of carriers located at different bandwidths.

Multi-carriers represent all frequency bands used by the base station. For example, the LTE-A system includes multi-carriers of 100 MHz. Component carrier means element carrier constituting multi-carriers. In other words, a plurality of component carriers constitute multi-carriers through carrier aggregation.

The present invention can be applied to the case where the user equipment transmits uplink data to the base station by using a plurality of frequencies unlike dual cell HSPA, carrier aggregation.

Figure 4:
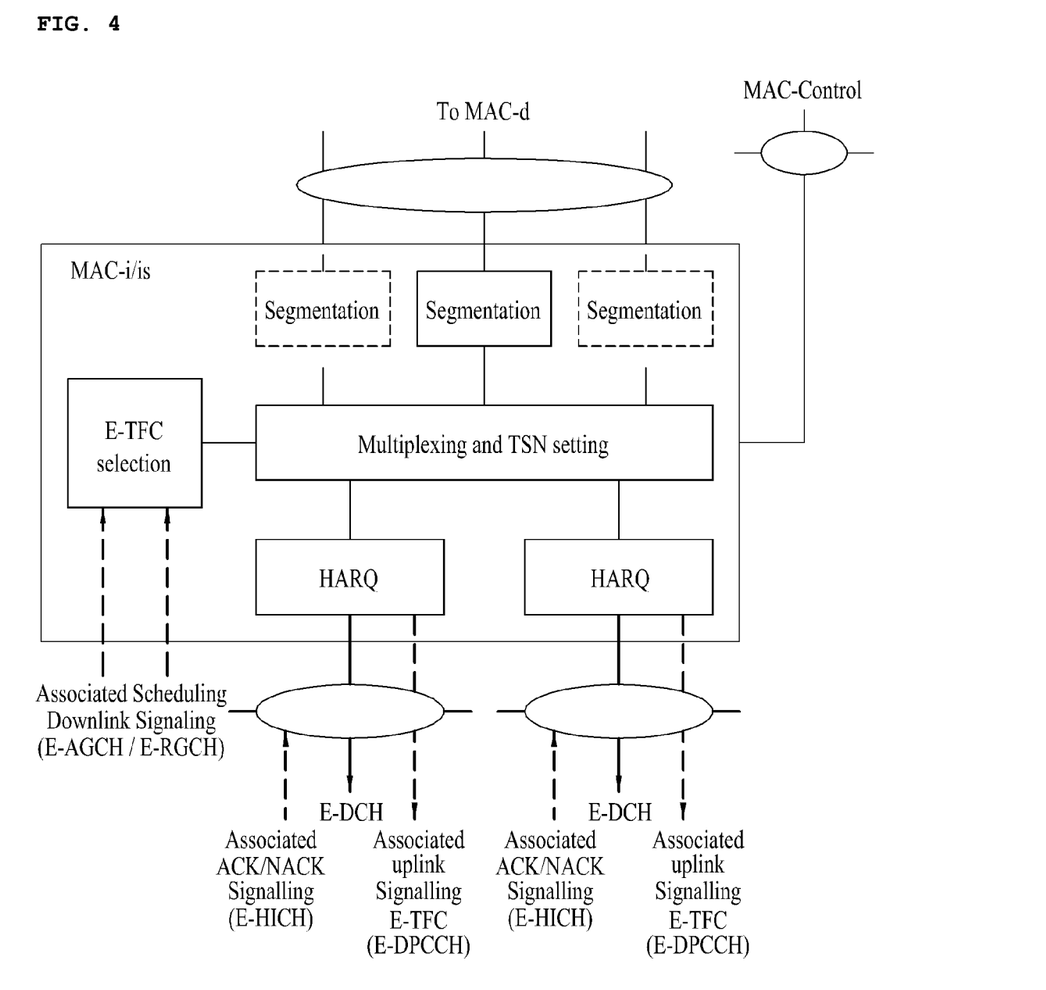
FIG. 4 is a diagram illustrating a structure of a dual cell E-DCH of a user equipment.

FIG. 4 is a diagram illustrating a structure of a dual cell E-DCH of a user equipment. The dual cell E-DCH supports an uplink through two frequencies, and since one HARQ entity manages one uplink, an operation related to two HARQ entities is performed in the dual cell E-DCH system. Also, since the user equipment processes transport blocks independently through each HARQ entity, in the dual cell E-DCH, the user equipment can transmit each transport block through two frequencies at the same time. A control channel and a traffic channel exist in each frequency. When the user equipment transmits data through the E-DCH, uplink frequency exists per E-DCH, and a downlink signal received from a network for uplink data transmission exists per frequency. Acknowledgement/non-acknowledgement (ACK/NACK) for data transmitted to each E-DCH is received in each E-HICH. The network notifies a grant value of data to be transmitted to each E-DCH through an enhanced absolute grant channel (E-AGCH) existing per frequency. Also, since interference exists due to the transmitted data, an enhanced relative grant channel (E-RGCH), which indicates to increase or decrease a grant value used for data transmission, exists per frequency.

The uplink is always set together with the downlink. In the same manner as the dual cell E-DCH, the user equipment can receive data through one or more frequencies even on the downlink. At this time, a high speed dedicated physical control channel (HS-DPCCH), through which a response message to the data received using a plurality of frequencies is transmitted, is transmitted through one frequency. This frequency for the uplink will be referred to as primary uplink frequency. When a plurality of uplink frequencies is set, all frequencies other than the primary uplink frequency will be referred to as uplink supplementary frequencies.

The user equipment can transmit data by using a non-scheduled grant for data transmission using a constant grant through the primary uplink frequency. The non-scheduled grant is to transmit data at a constant time interval like voice over IP (VoIP).

Figure 5:
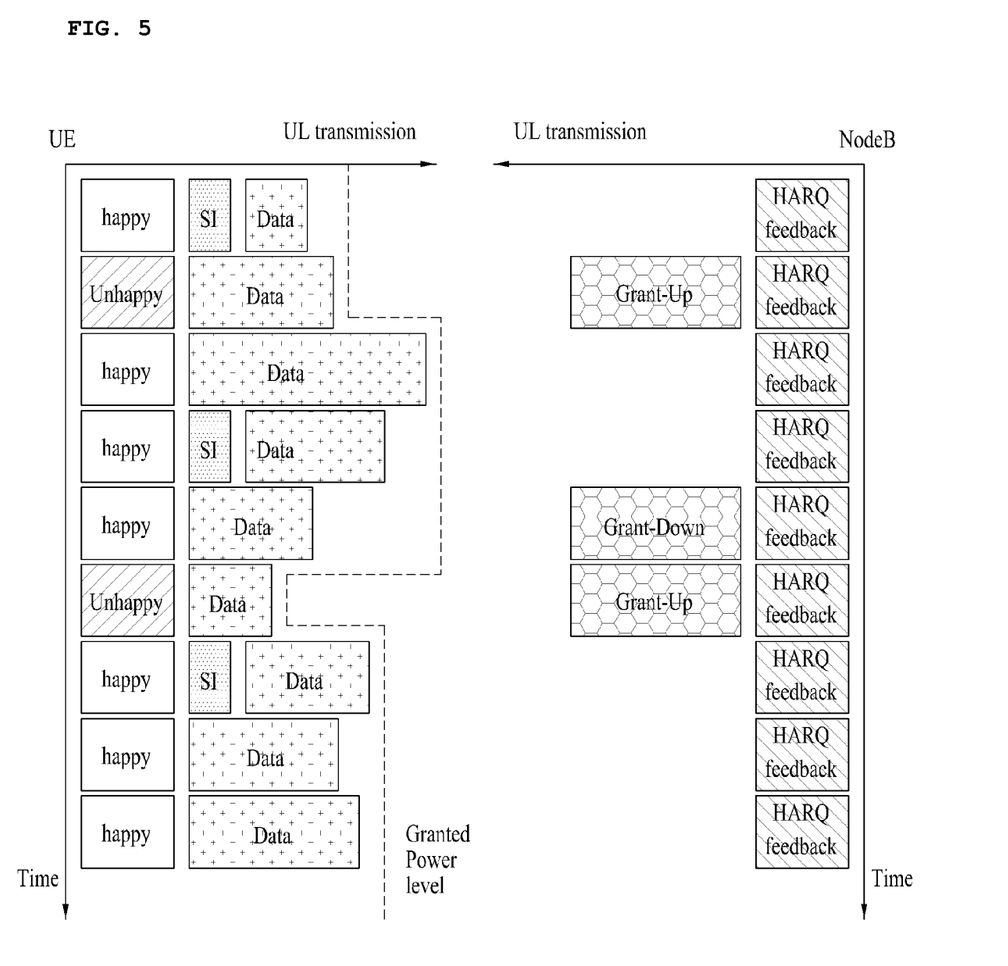
FIG. 5 is a diagram illustrating a relation of a happy bit, uplink scheduling information (SI), and a grant.

Next, transmission of uplink scheduling information of the user equipment will be described with reference to FIG. 5. FIG. 5 is a diagram illustrating a relation of a happy bit, uplink scheduling information (SI), and a grant.

The user equipment transmits uplink scheduling information to the base station to notify uplink resources required for itself. The user equipment transmits a happy bit to the network per TTI, and notifies the network of data to be transmitted, during scheduling information transmission, wherein the data are stored in an RLC buffer and a MAC divisional buffer.

The user equipment transmits information on its available power for E-DCH or data for transmission to the network through uplink scheduling information, and a network scheduler allocates radio resources to the user equipment by considering the radio channel status of the user equipment and the uplink scheduling information of the user equipment. Allocation of radio resources is performed through the E-AGCH to notify a grant for a power to be used by each user equipment.

The happy bit includes 1 bit, and is transmitted through the E-DPCCH. The happy bit represents whether the user equipment can use more uplink resources.

If more data than data that can be transmitted as a grant value notified by the network exist and an idle power that can transmit E-TFCI higher than the current E-TFCI exists, the user equipment sets the happy bit to unhappy and transmits it to the network. In such case, since the user equipment can process more data, the network will transmit data to the user equipment by increasing the grant value. It is noted from FIG. 5 that, as the user equipment transmits the happy bit set to unhappy at the second TTI, the base station increases the grant value.

If there are no data, which will be transmitted, more than the current E-TFCI or if there is no idle power, the user equipment sets the happy bit to happy and transmits it to the network. Then, the network determines that the user equipment cannot process more data, and transmits a grant previously transmitted to the user equipment or a grant smaller than the grant previously transmitted to the user equipment.

Also, if the user equipment notifies that data to be transmitted through uplink scheduling information are small and includes the happy bit set to happy, the network determines that data to be transmitted from the user equipment are small and notifies a value lower than the grant previously transmitted to the user equipment.

Next, E-DCH data transmission will be described.

The user equipment determines a size of a transport block, which will be transmitted at next TTI, based on data stored in its buffer, power that can be transmitted therefrom, and the grant notified from the network to the user equipment. The user equipment updates a serving grant state parameter by using the grant received from the network. The user equipment determines a size of a maximum transport block that can be transmitted at next TTI by using the serving grant state parameter. Afterwards, after calculating the remaining power that can be transmitted from the user equipment, the user equipment selects the E-TFCI that can be transmitted through the E-DCH. The size of the transport block is defined for each E-TFCI. For example, the size of the transport block is 199 bits for the E-TFCI 15. Accordingly, if the E-TFCI is selected, the size of the transport block and the transmission power are determined.

Next, a method for dividing a power of a user equipment that performs a dual cell E-DCH operation will be described with reference to FIG. 6.

The user equipment divides its available maximum power for each of a plurality of frequencies. At this time, the maximum power that can be used by the user equipment is a smaller value of a maximum power based on power class of the user equipment and a maximum power received from the network. First of all, the user equipment allocates a power required for data transmission through a non-scheduled grant to the primary uplink frequency. Also, the user equipment allocates the other power of the maximum power except for the power required for data transmission through the non-scheduled grant to each of the plurality of frequencies at a grant rate of each of the plurality of frequencies received from the base station.

Figure 6:
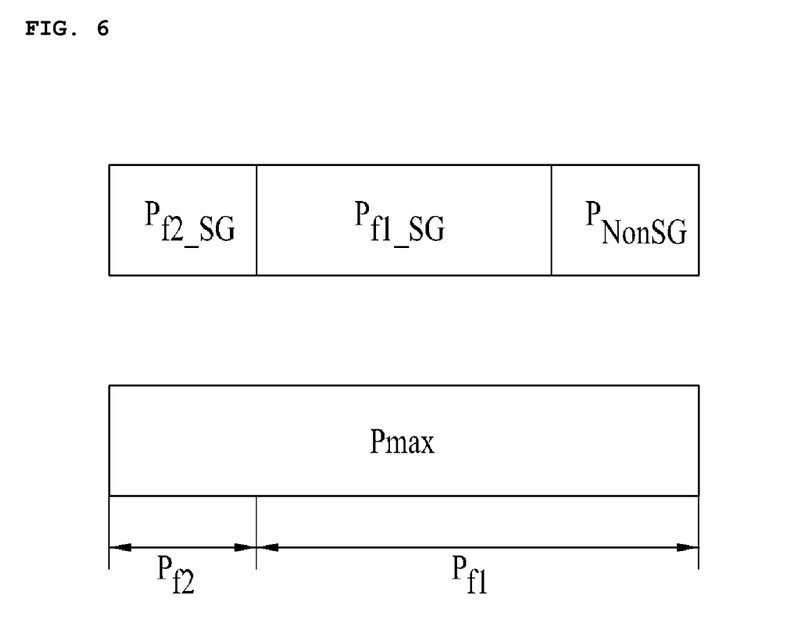
FIG. 6 is a diagram illustrating that a maximum power of a user equipment is divided to two frequencies.

FIG. 6 is a diagram illustrating that a maximum power of a user equipment is divided to two frequencies.

In FIG. 6, $P_{f1}$ represents the power allocated to the primary uplink frequency, and $P_{f2}$ represents the power allocated to the secondary uplink frequency.

Supposing that the maximum power of the user equipment is $P_{UEmax}$, the power required for data transmission through the non-scheduled grant is $P_{NonSG}$, the grant of the primary uplink frequency is $AG_{f1}$, and the grant of the secondary uplink frequency is $AG_{f2}$, $P_{f1}$ and $P_{f2}$ can be expressed by the following Equation 1.

$$P_{f1} = (P_{UEmax} - P_{NonSG}) * (AG_{f1}/(AG_{f2} + AG_{f1})) + P_{NonSG}$$

$$P_{f2} = (P_{UEmax} - P_{NonSG}) * (AG_{f2}/(AG_{f2} + AG_{f1})) \quad \text{[Equation 1]}$$

For example, if $P_{UEmax}$ is 10 mW, $P_{NonSG}$ is 4 mW, $AG_{f1}$ is 10, and $AG_{f2}$ is 5, $P_{f1}$ is 8 mW, and $P_{f2}$ is 2 mW.

Next, a method of a power increase/decrease request according to the first embodiment of the present invention will be described with reference to FIG. 7.

Figure 7:
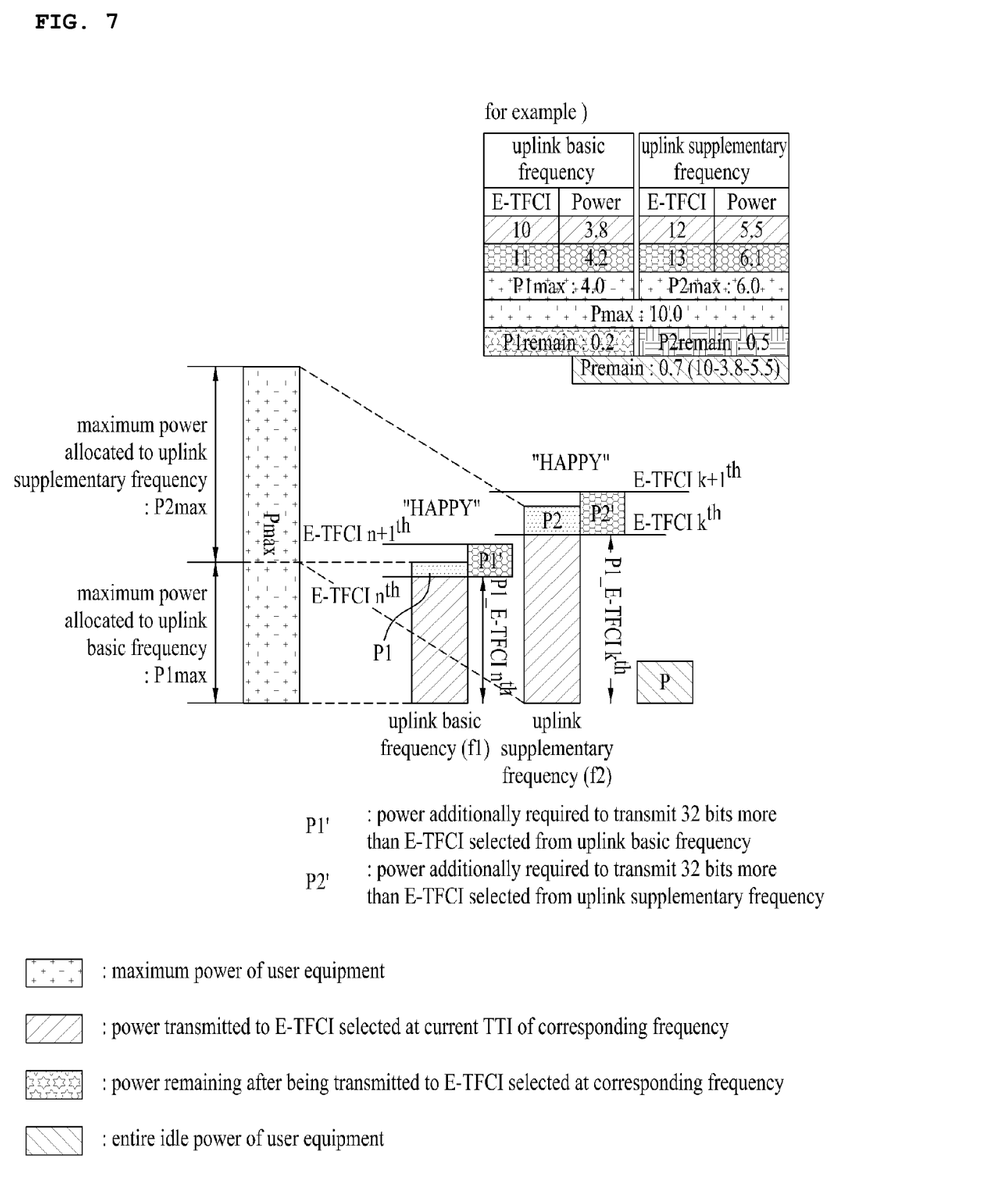
FIG. 7 is a diagram illustrating a method of a power increase/decrease request according to the first embodiment of the present invention.

FIG. 7 is a diagram illustrating a method of a power increase/decrease request according to the first embodiment of the present invention.

The user equipment divides the power for each of the plurality of frequencies in accordance with the aforementioned method. Although the user equipment uses two frequencies in the first embodiment of the present invention, the present invention is not limited to the first embodiment of the present invention.

The user equipment selects the E-TFCI, which can be transmitted through each of the plurality of frequencies, by considering the grant received from the base station and the divided power.

In FIG. 7, it is supposed that the maximum power of the user equipment is 10 mW, the power allocated to the primary uplink frequency is 4 mW, and the power allocated to the secondary uplink frequency is 6 mW. If 3.8 mW is required for the primary uplink frequency to transmit E-TFCI 10 and 4.2 mW is required for the primary uplink frequency to transmit E-TFCI 11, the user equipment will select E-TFCI 10 for the primary uplink frequency. Also, if 5.5 mW is required for the secondary uplink frequency to transmit E-TFCI 12 and 6.1 mW is required for the secondary uplink frequency to transmit E-TFCI 13, the user equipment will select E-TFCI 12 for the secondary uplink frequency.

After selecting the E-TFCI, the user equipment requests the base station to increase and decrease the power by calculating the idle power.

The idle power for each frequency is a value obtained by subtracting the power required to transmit the selected E-TFCI from the power allocated to each frequency, and the idle power of the user equipment is a sum of idle powers of the respective frequencies. In FIG. 7, the idle power P1 of the primary uplink frequency is 0.2 mW, and the idle power P2 of the secondary uplink frequency is 0.5 mW. The idle power P of the user equipment is the idle power P1 of the primary uplink frequency+the idle power P2 of the secondary uplink frequency, i.e., 0.7 mW.

Supposing that the power required to transmit the selected E-TFCI is $P1\_{E\text{-}TFCInth}$ and the minimum power required to transmit E-TFCI that can transmit more data than those of the selected E-TFCI is $P1_{E\text{-}TFCIn+1th}$, the power P1' additionally required to transmit E-TFCI that can transmit more data than those of the selected E-TFCI is $P1\_{E\text{-}TFCInth} - P1\_{E\text{-}TFCIn+1th}$. Accordingly, if the idle power is greater than $P1\_{E\text{-}TFCInth} - P1\_{E\text{-}TFCIn+1th}$, since the user equipment includes the power that can transmit more data, it requests the base station to increase the power, thereby requesting more grants. If the idle power is less than $P1\_{E\text{-}TFCInth} - P1\_{E\text{-}TFCIn+1th}$, since the user equipment does not include the power that can transmit more data even though it receives more grants from the base station, it requests the base station to maintain or decrease the power. In order to request the base station to increase the power, the user equipment sets the happy bit to unhappy. In order to request the base station to maintain or decrease the power, the user equipment sets the happy bit to happy.

In the first embodiment of the present invention, the base station determines whether to increase or decrease the power by using the idle power for each frequency. In FIG. 7, the idle power of the primary uplink frequency is 0.2 mW, and the power additionally required for the primary uplink frequency to transmit E-TFCI 11 is 0.4 mW. Accordingly, since the idle power is less than the minimum power required to transmit E-TFCI that can transmit more data than those of the selected E-TFCI, the user equipment requests the base station to maintain or decrease the power.

In FIG. 7, the idle power of the secondary uplink frequency is 0.5 mW, and the power additionally required for the secondary uplink frequency to transmit E-TFCI 13 is 0.6 mW. Accordingly, since the idle power is less than the minimum power required to transmit E-TFCI that can transmit more data than those of the selected E-TFCI, the user equipment requests the base station to maintain or decrease the power.

In other words, in FIG. 7, the user equipment sets the happy bit to happy for each of both the primary uplink frequency and the secondary uplink frequency and transmits it to the base station, and the base station transmits the same grant value as that previously transmitted to the user equipment.

Figure 8:
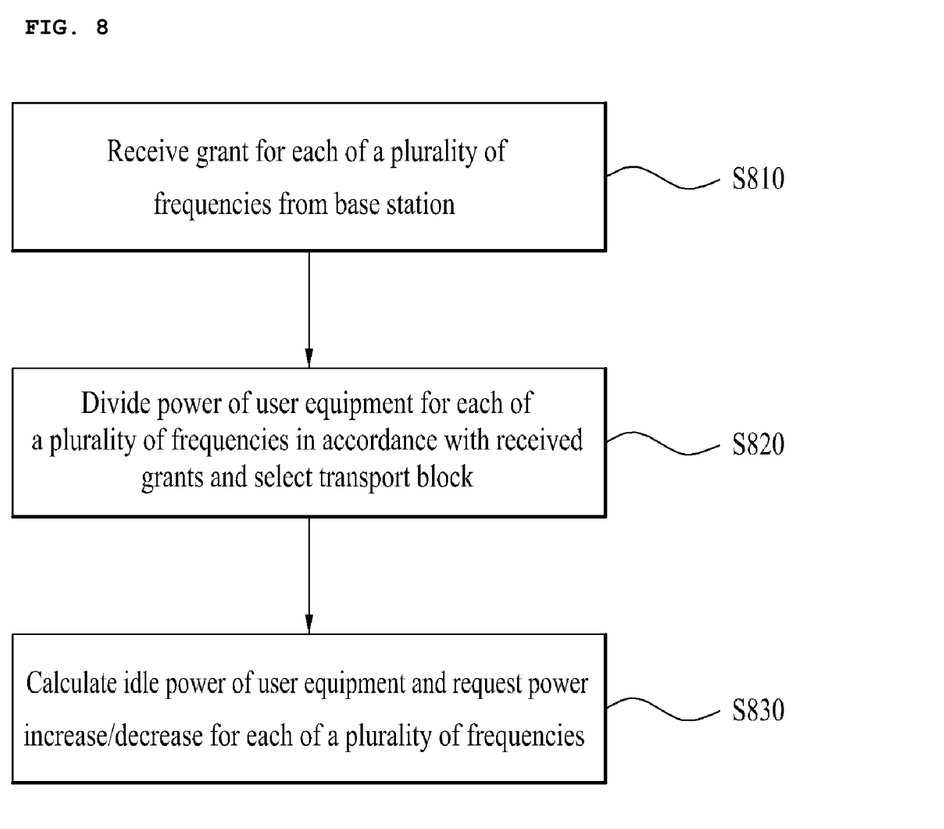
FIG. 8 is a flow chart illustrating a method of a power increase/decrease request according to the second embodiment of the present invention.

Next, a method of a power increase/decrease request according to the second embodiment of the present invention will be described with reference to FIG. 8 and FIG. 9. FIG. 8 is a flow chart illustrating a method of a power increase/decrease request according to the second embodiment of the present invention.

As illustrated in FIG. 8, the user equipment receives a grant for each of a plurality of frequencies from the base station (S810). If the user equipment uses a plurality of uplink frequencies, it receives a grant for each of the plurality of uplink frequencies from the base station.

For example, supposing that the user equipment uses an primary uplink frequency and an secondary uplink frequency, a grant for the primary uplink frequency is $AG_{f1}$, and a grant for the secondary uplink frequency is $AG_{f2}$. Although the user equipment uses two uplink frequencies in the embodiment of the present invention, the present invention is not limited to such embodiment.

The user equipment divides its maximum power for each of a plurality of frequencies in accordance with the grants for the plurality of frequencies and selects a transport block for each of the plurality of frequencies by considering the divided powers and the received grants (S820). The user equipment selects E-TFCI for each of the plurality of frequencies by considering the divided powers and the received grants. The E-TFCI is an index for the transport block, and the transport block is determined if the E-TFCI is determined.

The user equipment divides its maximum power for each of the plurality of frequencies in accordance with the aforementioned method for dividing a power. In other words, the user equipment first allocates the power corresponding to the non-scheduled grant to the primary uplink frequency and allocates the other power to the primary uplink frequency and the secondary uplink frequency in accordance with a ratio of $AG_{f1}$ and $AG_{f2}$.

The user equipment selects a transport block by considering the power allocated for each of the plurality of frequencies and the received grants.

The user equipment calculates its remaining power and performs a power increase/decrease request for each of the plurality of frequencies by using the remaining power (S830).

The idle power of the user equipment is obtained by subtracting powers required to transmit E-TFCI selected for each of the plurality of frequencies from the maximum power of the user equipment. For example, if the user equipment uses two uplink frequencies, selects E-TFCI nth for the primary uplink frequency and selects E-TFCI kth for the secondary uplink frequency, the remaining power of the user equipment is expressed by the following Equation 2.

$$P = P_{UE\,Max} - (P1\_{E\text{-}TFCI\,nth} + P2\_{E\text{-}TFCI\,kth}) \qquad \text{[Equation 2]}$$

In this case, $P1\_{E\text{-}TFCI\ nth}$ is the power required to transmit E-TFCI nth by using the primary uplink frequency, and $P2\_{E\text{-}TFCI\ kth}$ is the power required to transmit E-TFCI kth by using the primary uplink frequency.

The user equipment determines whether to increase or decrease the power for the plurality of uplink frequencies in due order. The order of determining whether to increase or decrease the power for the plurality of uplink frequencies may include various examples.

First of all, the user equipment may first determine whether to increase or decrease the power for the frequency that can transmit data of more bits with the remaining power, by calculating bits of data that can be transmitted by the idle power for each of the plurality of frequencies.

Also, the user equipment may first determine whether to increase or decrease the power for the frequency that requires less power to additionally transmit 32 bits or may first determine the power for the frequency that requires more power to additionally transmit 32 bits, by calculating the power required to additionally transmit 32 bits for each of the plurality of frequencies.

Also, the user equipment may determine whether to increase or decrease the power for the plurality of frequencies in the order of the greater DPCCH power, or may determine whether to increase or decrease the power for the plurality of frequencies in the order of the smaller DPCCH power.

Also, the user equipment may determine whether to increase or decrease the power for the plurality of frequencies in the order of the greater received grant, or may determine whether to increase or decrease the power for the plurality of frequencies in the order of the smaller received grant.

Also, the user equipment may first determine whether to increase or decrease the power for the primary uplink frequency, or may first determine whether to increase or decrease the power for the secondary uplink frequency.

Also, the user equipment first selects a random uplink frequency.

Also, the user equipment may first determine whether to increase or decrease the power for the frequency that transmits non-scheduled data.

Also, the user equipment may first determine whether to increase or decrease the power for the frequency that will transmit a transport block that includes data of high priority of a logical channel.

Also, the user equipment may first determine whether to increase or decrease the power for the frequency to which data of the highest priority is allocated during data allocation.

Supposing that the frequency first determined by the user equipment as to whether to increase or decrease the power is the first frequency, the user equipment determines whether to increase or decrease the power of the first frequency by using the entire idle power. It is supposed that E-TFCI mth is selected from the first frequency and the power of $P1\_{E\text{-}TECI\ mth}$ is required for the first frequency to transmit the E-TFCI mth. It is also supposed that the power required for the first frequency to transmit E-TFCI m+1th, which can transmit more data than those of the E-TFCI mth, is $P1\_{E\text{-}TFCI\ m+1th}$. In this case, if the Equation 3 is satisfied, the user equipment determines that more data can be transmitted through the first frequency, and requests the base station to maintain the power. When the user equipment requests the base station to maintain the power for the first frequency, it requests the base station to maintain or decrease the power for all of the plurality of frequencies.

$$P \geq P1\_{E\text{-}TFCI\ m+1th} - P1\_{E\text{-}TFCI\ mth} \qquad [\text{Equation 3}]$$

In other words, if the remaining power P of the user equipment is more than the power additionally required to transmit minimum E-TFCI that transmits more data than those of the E-TFCI selected from the first frequency, the user equipment requests the base station to increase the power for the first frequency.

The user equipment can request the base station to increase, maintain or decrease the power by using bits indicating whether to increase or decrease the power. In other words, if the user equipment requests the base station to increase the power, it transmits bits indicating whether to increase or decrease the power by setting the bits to increase the power. If the user equipment requests the base station to maintain or decrease the power, it transmits bits indicating whether to increase or decrease the power by setting the bits to maintain or decrease the power. For example, the user equipment can request the base station to increase or decrease the power by using the happy bit. In this case, in order to request the base station to increase the power, the user equipment transmits the happy bit to the base station by setting the happy bit set to unhappy. Also, in order to request the base station to maintain or decrease the power, the user equipment transmits the happy bit to the base station by setting the happy bit set to happy.

If the user equipment requests the base station to increase the power for the first frequency, it determines whether to increase the power for the second frequency by using the power obtained by subtracting the power $P1\_{E\text{-}TFCI\ m+1th} - P1\_{E\text{-}TECI\ mth}$ additionally required to transmit E-TFCI, which transmits more data than those of E-TFCI selected from the first frequency, from the remaining power of the user equipment.

It is supposed that E-TFCI pth is selected from the second frequency and the power of $P1\_{E\text{-}TFCI\ pth}$ is required for the second frequency to transmit the E-TFCI pth. It is also supposed that the power required for the second frequency to transmit E-TFCI p+1th, which can transmit more data than those of the E-TFCI pth, is $P1\_{E\text{-}TFCI\ p+1th}$. In this case, if the Equation 4 is satisfied, the user equipment determines that more data can be transmitted through the second frequency, and requests the base station to increase the power. If the Equation 4 is not satisfied, the user equipment determines that more data cannot be transmitted through the second frequency, and requests the base station to maintain or decrease the power.

$$P - (P1\_{E\text{-}TFCI\ m+1th} - P1\_{E\text{-}TFCI\ mth}) \geq P2\_{E\text{-}TFCI\ p+1th} - P1\_{E\text{-}TFCI\ pth} \qquad [\text{Equation 4}]$$

In the same manner as the aforementioned description, the user equipment determines whether to increase or decrease the power for the plurality of frequencies in due order and requests the base station to increase or decrease the power.

Figure 9:
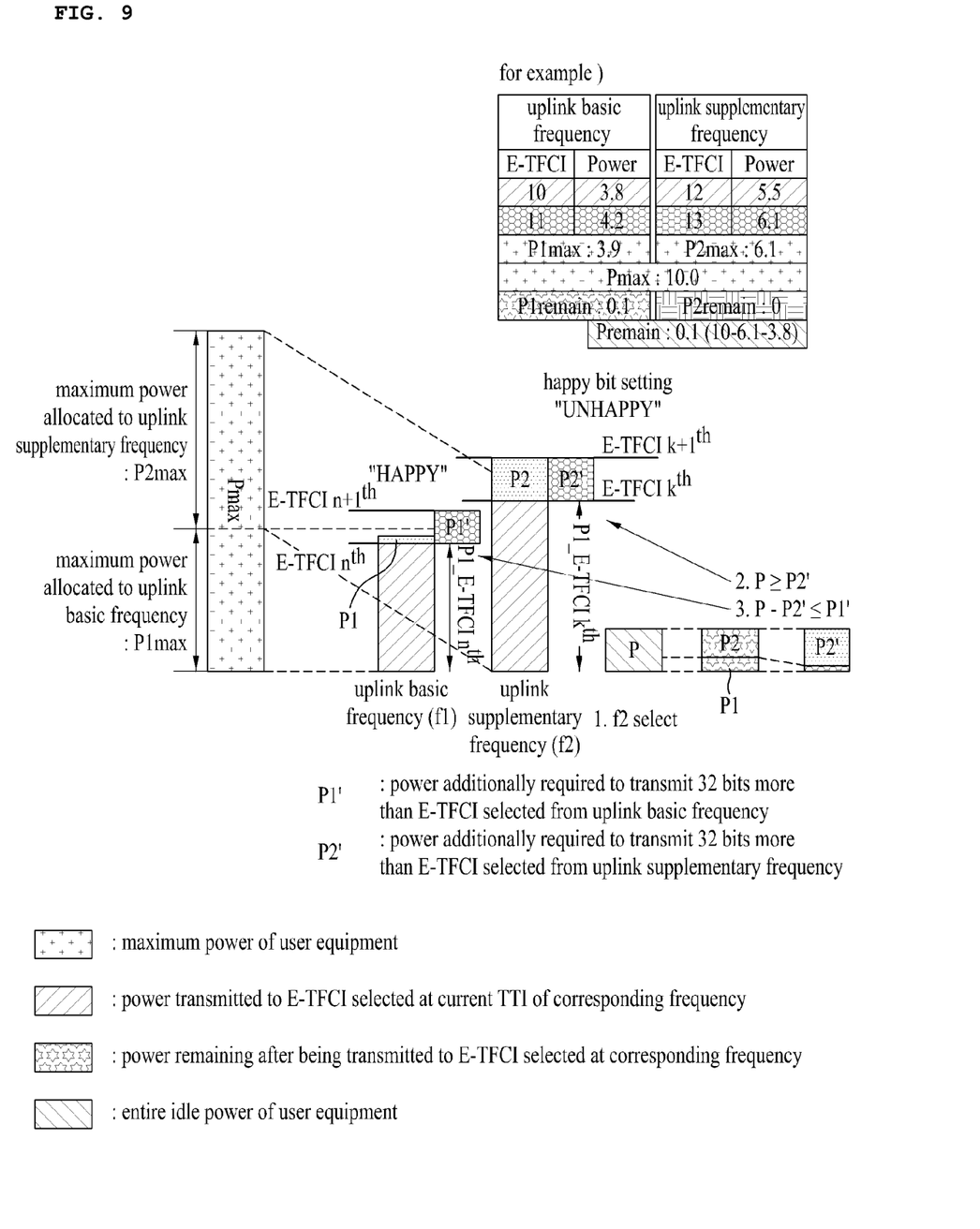
FIG. 9 is a diagram illustrating a method of a power increase/decrease request according to the second embodiment of the present invention.

FIG. 9 is a diagram illustrating a method of a power increase/decrease request according to the second embodiment of the present invention. In FIG. 9, $P2_{max}$ is allocated to the secondary uplink frequency, and $P1_{max}$ is allocated to the primary uplink frequency. E-TFCI 10 is selected from the primary uplink frequency, and E-TFCI 12 is selected from the secondary uplink frequency.

In this case, the remaining power of the user equipment becomes 0.7 mW. In FIG. 9, the user equipment first determines whether to increase or decrease the power of the secondary uplink frequency. The power additionally required to transmit E-TFCI 13 selected from the secondary uplink frequency is 0.6 mW, and the remaining power (0.7 mW) of the user equipment is more than the power (0.6 mW) additionally required to transmit E-TFCI 13 selected from the secondary uplink frequency. Accordingly, the user equipment sets the happy bit for the secondary uplink frequency to unhappy.

If the power (0.6 mW) additionally required to transmit the E-TFCI 13 selected from the secondary uplink frequency is subtracted from the remaining power (0.7 mW), the power of 0.1 mW is obtained. Since the power of 0.1 mW is less than the power of 0.4 mW additionally required to transmit E-TFCI 11 from the primary uplink frequency, the user equipment sets the happy bit for the primary uplink frequency to happy and transmits it to the base station.

Figure 10:
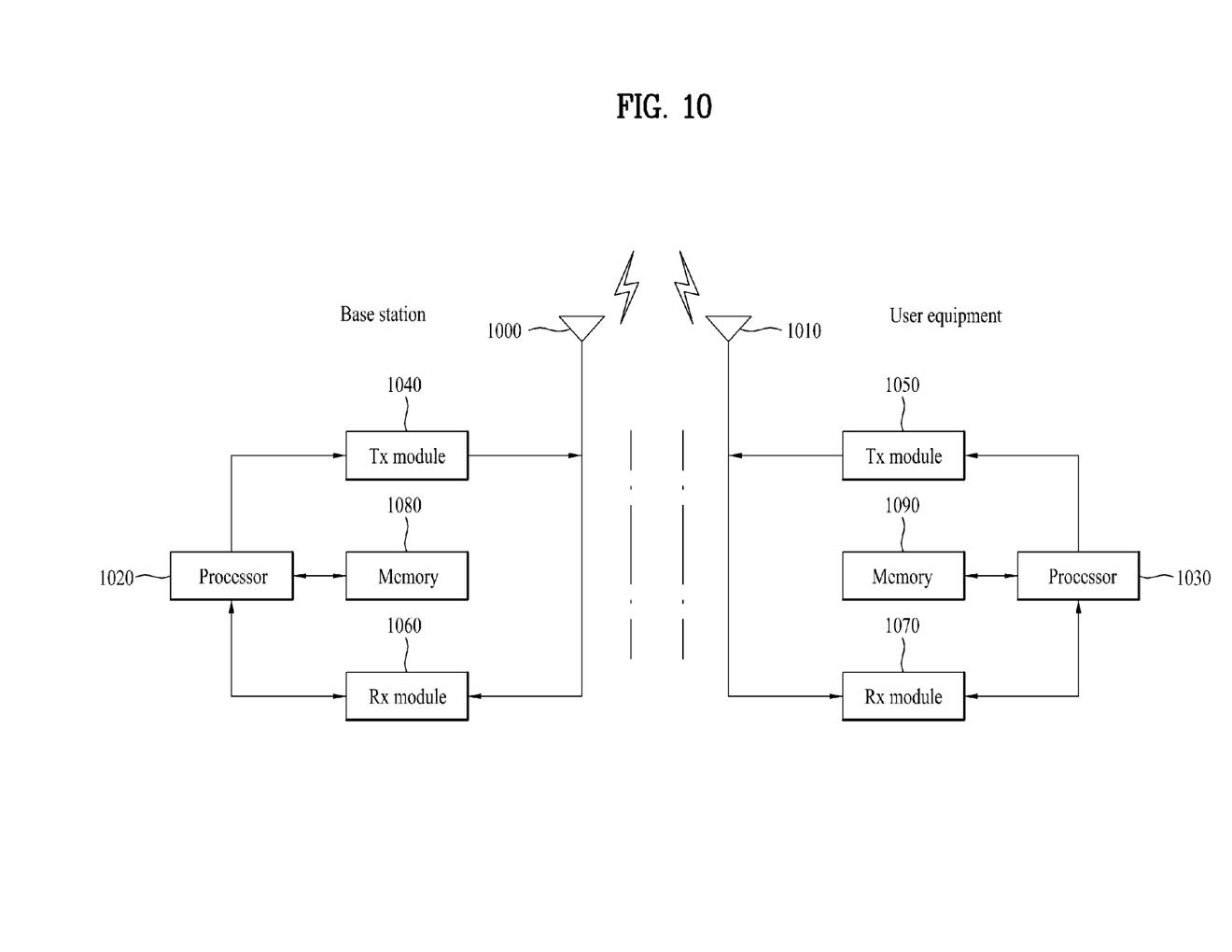
FIG. 10 is a block diagram illustrating an example of a transmitter and a receiver through which the embodiments of the present invention can be carried out, in accordance with another embodiment of the present invention.

FIG. 10 is a block diagram illustrating an example of a transmitter and a receiver through which the embodiments of the present invention can be carried out, in accordance with another embodiment of the present invention.

Each of the transmitter and the receiver includes an antenna 1000, 1010 for transmitting and receiving information, data, signal and/or message, a Tx module 1040, 1050 for transmitting the message by controlling the antenna, an Rx module 1060, 1070 for receiving the message by controlling the antenna, a memory 1080, 1090 for storing information related to communication with the base station, and a processor 1020, 1030 for controlling the Tx module, the Rx module and the memory.

The antenna 1000, 1010 serves to transmit a signal generated by the Tx module 1040, 1050 to the outside or receive a radio signal from the outside to transfer the radio signal to the Rx module 1060, 1070. If a MIMO function is supported, two or more antennas may be provided.

The processor 1020, 1030 generally controls the whole operation of the transmitter or the receiver. For example, the processor 1020, 1030 can perform a controller function for performing the aforementioned embodiments of the present invention, a medium access control (MAC) frame variable control function according to service characteristics and radio wave condition, a handover function, an authentication and encryption function, etc. In more detail, the processor 1020, 1030 can further include an encryption module for controlling encryption of various messages and a timer module for controlling transmission and reception of various messages.

If the user equipment receives a command to disable a specific one of a plurality of uplink frequencies from the base station, the processor 1020 of the user equipment resets a HARQ process buffer related to the specific uplink frequency. In other words, the processor 1020 of the user equipment discards all data of the HARQ process buffer related to the specific uplink frequency. Alternatively, the processor 1020 of the user equipment may reset the HARQ process buffer related to the specific uplink frequency when the user equipment receives a command to re-enable the specific one of the plurality of uplink frequencies from the base station.

If the user equipment receives a command to enable a specific one of a plurality of uplink frequencies from the base station, the processor 1020 of the user equipment sets a serving grant of the specific uplink frequency.

At this time, if the user equipment receives a serving grant value from the base station, the processor 1020 of the user equipment sets the serving grant of the specific uplink frequency to the received serving grant value. If the user equipment does not receive a serving grant value from the base station, the processor 1020 of the user equipment sets the serving grant of the specific uplink frequency to a zero grant.

The Tx module 1040, 1050 performs predetermined coding and modulation for signal and/or data, which are scheduled from the processor 1020, 1030 and then transmitted to the outside, and then transfers the coded and modulated data to the antenna 1000, 1010.

The Tx module 1040 of the base station transmits HS-SCCH order to enable or disable the specific one of the plurality of uplink frequencies to the user equipment.

The Rx module 1060, 1070 performs decoding and demodulation for the radio signal received from the outside through the antenna 1000, 1010 to recover original data and then transfer the recovered data to the processor 1020, 1030.

The Rx module 1070 of the user equipment receives the HS-SCCH order to enable or disable the specific one of the plurality of uplink frequencies from the base station.

When the Rx module 1070 of the user equipment receives the HS-SCCH order to enable or disable the specific one of the plurality of uplink frequencies from the base station, it can receive a serving grant value to be used after the specific uplink frequency is re-enabled.

The memory 1080, 1090 may store a program for processing and control of the processor 1020, 1030, or may perform a function for temporarily storing input/output data (in case of the user equipment, uplink grant (UL grant) allocated from the base station, system information, station identifier (STID), flow identifier (FID), action time, zone allocation information, frame offset information, etc.).

Also, the memory 1080, 1090 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of operating of a user equipment in a wireless communication system using a plurality of uplink frequencies, the method comprising the steps of:
   receiving grants for each of the plurality of uplink frequencies from a base station;
   dividing a maximum power of the user equipment for each of the plurality of uplink frequencies in accordance with the received grants for each of the received uplink frequencies, and selecting a corresponding transport block for each of the plurality of uplink frequencies by considering the received grants; and
   comparing a remaining power of the user equipment to a first subtraction power obtained by subtracting a power required to transmit a first transport block selected for a first uplink frequency from a power required to transmit a first minimum transport block, which transmits more data than those of the first transport block,
   wherein the remaining power of the user equipment is obtained by subtracting a power required to transmit the selected corresponding transport block for each of the plurality of uplink frequencies from the maximum power of the user equipment.

2. The method as claimed in claim 1, further comprising:
   requesting power increase for the first uplink frequency if the remaining power of the user equipment is more than the first subtraction power.

3. The method as claimed in claim 2, further comprising:
requesting power increase for a second uplink frequency different from the first uplink frequency, if a second subtraction power obtained by subtracting the first subtraction power from the remaining power of the user equipment is more than a third subtraction power obtained by subtracting a power required to transmit a second transport block selected for a second uplink frequency from a power required to transmit the second minimum transport block, which transmits more data than those of the second transport block.

4. The method as claimed in claim 2, wherein the power increase is requested using a bit.

5. The method as claimed in claim 1, further comprising:
requesting power maintenance for all of the plurality of uplink frequencies, if the remaining power of the user equipment is less than the first subtraction power.

6. The method as claimed in claim 1, wherein the plurality of uplink frequencies include a primary uplink frequency and a secondary uplink frequency, and the first uplink frequency is the secondary uplink frequency.

7. The method as claimed in claim 1, wherein an extended transport format combination indicator (E-TFCI) is used to identify a size of at least one of the first transport block, the second transport block, the first minimum transport block and the second minimum transport block.

8. A user equipment in a wireless communication system using a plurality of uplink frequencies, the user equipment comprising:
an Rx module receiving grants for each of the plurality of uplink frequencies from a base station;
a processor dividing a maximum power of the user equipment for each of the plurality of uplink frequencies in accordance with the received grants for each of the received uplink frequencies, selecting a corresponding transport block for each of the plurality of uplink frequencies by considering the received grants, and comparing a remaining power of the user equipment to a first subtraction power obtained by subtracting a power required to transmit a first transport block selected for a first uplink frequency from a power required to transmit a first minimum transport block, which transmits more data than those of the first transport block,
wherein the remaining power of the user equipment is obtained by subtracting a power required to transmit the selected corresponding transport block for each of the plurality of uplink frequencies from the maximum power of the user equipment.

9. The user equipment as claimed in claim 8, further comprising:
a Tx module requesting power increase for the first uplink frequency to the base station, if the remaining power of the user equipment is more than the first subtraction power.

10. The user equipment as claimed in claim 9, wherein the Tx module requests power increase for a second uplink frequency different from the first uplink frequency to the base station, if a second subtraction power obtained by subtracting the first subtraction power from the remaining power of the user equipment is more than a third subtraction power obtained by subtracting a power required to transmit a second transport block selected for a second uplink frequency from a power required to transmit the second minimum transport block, which transmits more data than those of the second transport block.

11. The user equipment as claimed in claim 9, wherein the Tx module requests power maintenance for all of the plurality of uplink frequencies to the base station, if the remaining power of the user equipment is less than the first subtraction power.

12. The user equipment as claimed in claim 9, wherein the power increase is requested using a bit.

13. The user equipment as claimed in claim 8, wherein the plurality of uplink frequencies include a primary uplink frequency and a secondary uplink frequency, and the first uplink frequency is the secondary uplink frequency.

14. The user equipment as claimed in claim 8, wherein an extended transport format combination indicator (E-TFCI) is used to identify a size of at least one of the first transport block, the second transport block, the first minimum transport block and the second minimum transport block.

* * * * *